United States Patent [19]

Nagashima et al.

[11] Patent Number: 4,814,241
[45] Date of Patent: Mar. 21, 1989

[54] ELECTROLYTES FOR REDOX FLOW BATTERIES

[75] Inventors: Ikuo Nagashima, Kobe; Jun Fukui, Sakae; Hiroshi Gotoh, Tokyo; Hiroko Kaneko, Sakura; Ken Nozaki, Sakura; Takeo Ozawa, Sakura, all of Japan

[73] Assignees: Director-General, Agency of Industrial Science and Technology; Kawasaki Jukogyo Kabushiki Kaisha, Tokyo, Japan

[21] Appl. No.: 25,990

[22] Filed: Mar. 16, 1987

[30] Foreign Application Priority Data

Mar. 15, 1986 [JP] Japan ................................ 61-57915

[51] Int. Cl.$^4$ ............................................. H01M 8/08
[52] U.S. Cl. .................................... 429/199; 429/200; 429/202; 429/204; 429/15; 429/21
[58] Field of Search ................ 429/199, 200, 202–204, 429/107, 109, 15, 21

[56] References Cited

U.S. PATENT DOCUMENTS 4,362,791 12/1982 Kaneko et al. ...................... 429/101
4,469,760 9/1984 Giner et al. ............................ 429/21
4,550,065 10/1985 Fujii et al. ............................ 429/105

OTHER PUBLICATIONS

Gahn et al., IECEC No. 839269 (Proc. International Energy Conversion Conf., p. 1647 (1983).

Primary Examiner—Aaron Weisstuch
Attorney, Agent, or Firm—Wenderoth, Lind & Ponack

[57] ABSTRACT

An electrolyte for a Redox flow battery contains from 1 to 4 normal hydrochloric acid and at least 0.5 mole/liter of an active material, and further contains from 0.1 to 4 normalities of an acid comprising an anion which does not inhibit the electrode reactions in addition to the hydrochloric acid. This electrolyte reduces the cell resistivity and improves the solubility of active materials.

2 Claims, 4 Drawing Sheets

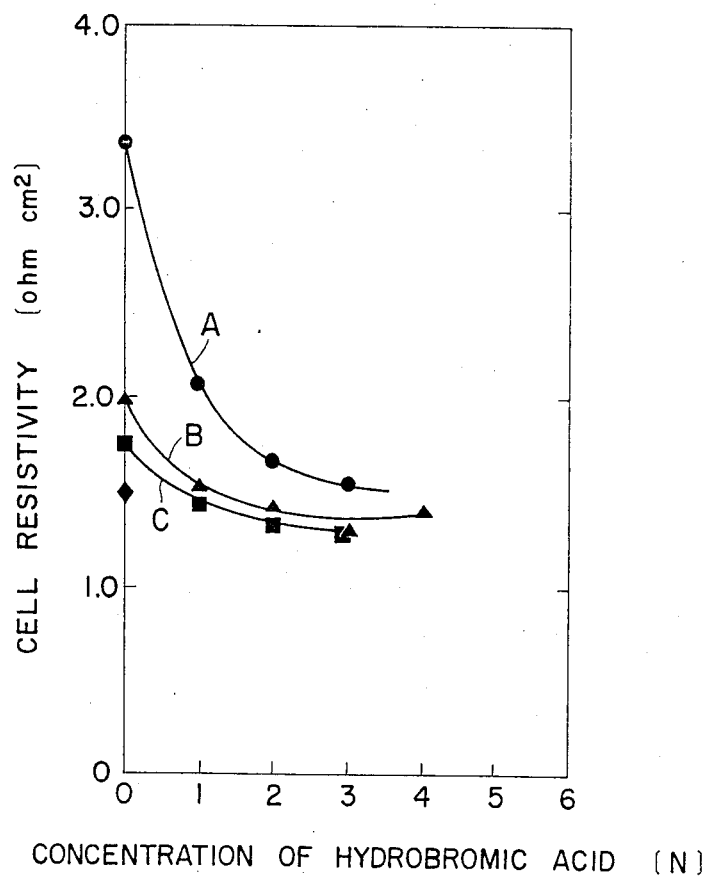
F I G. 2

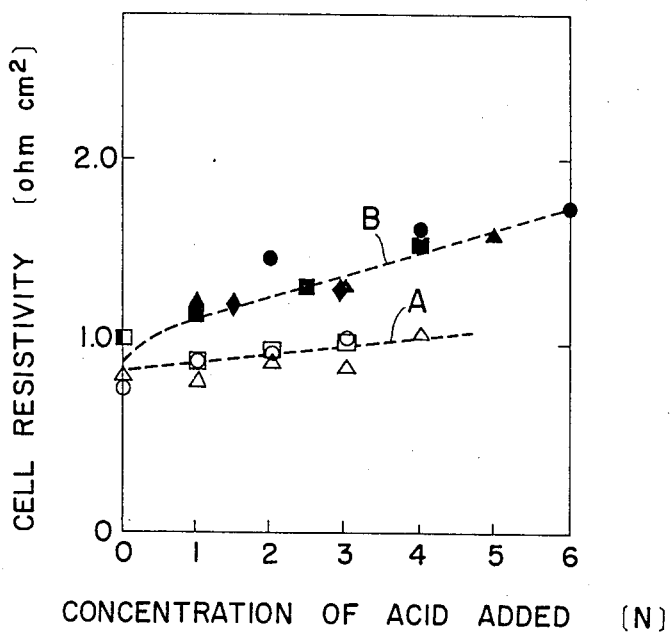
F I G. 4

4,814,241

ELECTROLYTES FOR REDOX FLOW BATTERIES

BACKGROUND OF THE INVENTION

This invention relates to electrolytes for redox flow batteries, and more particularly to an electrolyte for a redox flow battery wherein the cell resistivity is reduced and wherein the solubility of an active material is improved.

Electric power is readily convertible into various forms of energy and easy to control, and causes no environmental pollution during its consumption. Accordingly, the proportion of electric power in the total energy consumption is increasing every year. A unique feature of electric power supply is that it is produced and consumed, simultaneously. Under this condition, the electric power industries are required to supply electricity of high quality of constant frequency and constant voltage with high reliability while responsively meeting the demand of electricity, changing every moment. In actual practice, nuclear power plant and large-scale thermal power plants which cannot readily change their output but have high efficiency are operated at the rated output of as high efficiency as possible for base load. The large increase in demand for electric power in the daytime, i.e. peak load, is met by hydroelectric power generation suitable for changing its load according to electricity demand.

The surplus power in the nighttime generated by nuclear power and large-scale thermal power plants of good economy is stored by pumped hydro. However, the number of economically feasible sites for pumped hydro are becoming gradually reduced. Under such circumstances, various types of secondary batteries for battery energy storage systems which have relatively less restriction for location and cause no environmental pollution, and wherein electric power, which is an energy having great flexibility, is stored have been proposed. Among these secondary batteries, redox flow batteries wherein two redox systems are brought into contact with each other via a membrane are promising batteries.

By the term redox flow battery as used herein is meant a secondary battery which has flow cells, tanks and pumps, two electrolytes comprising aqueous solutions of active materials which are fed to the flow cells, and in which electrochemical reactions of charge and discharge are carried out, and electricity being stored in the tanks or the like in the form of a change in valence of the redox ions dissolved in the aqueous solution.

By the term Redox system is meant chemical species which can exists in different oxidation states or ion valences such as $Fe^{3+}/Fe^{2+}$ and $Cr^{3+}/Cr^{2+}$. The development of a redox flow battery comprising iron and chromium ions wherein an $Fe^{3+}/Fe^{2+}$ hydrochloric acid solution is used as a positive electrolyte and a $Cr^{2+}/Cr^{3+}$ hydrochloric acid solution is used as a negative electrolyte is currently well in progress. Other systems known include redox systems comprising iron-titanium, manganese-chromium, bromine-chromium, chlorine-chromium and the like.

The redox flow battery is superior to conventional secondary batteries in the following respects: (1) The storage capacity can be selected according to its use and location by merely varying the tank size; and (2) it is suitable for long term storage of weekly cycle or the like. Thus, the redox flow battery is a noteworthy battery for electric power storage.

FIG. 1 shows the outline of the redox flow battery. Power generated in a power station 1 is transmitted to a transforming station 2, from which power of transformed voltage is supplied to a load 3 and to a rectifier-inverter 4. The rectifier-inverter 4, converting AC from transformation station 2 into DC, supplies DC power to the redox flow battery 5 during charge and, inverting DC from redox flow battery 5, supplies AC power to transforming station 2 during discharge. The battery 5 consists of flow cell 8, tanks 6 and 7, pumps 13a and 13b.

The inside of the flow cell 8 is divided by a partitioning membrane 9 into positive electrolyte chamber 10a and negative electrolyte chamber 10b, which consist of the positive electrode 11 and the negative electrode 12, respectively. Positive electrolyte such as hydrochloric acid solution containing $Fe^{2+}/Fe^{3+}$ ions and negative electrolyte such as hydrochloric acid solution containing $Cr^{3+}/Cr^{2+}$ ions, stored in tanks 6 and 7, respectively are circulated during charge or discharge with pumps 13a and 13b through electrolyte chambers 10a and 10b via passages 14 and 15, respectively. For example, when an electrolyte containing Fe ions is used as a positive electrolyte and an electrolyte containing Cr ions is used as a negative electrolyte, the electrochemical reactions shown in the following formulae (1), (2) and (3) occur at each electrode surface in the flow cell 8 during charge or discharge.

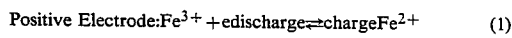

Positive Electrode: $Fe^{3+} + e \underset{charge}{\overset{discharge}{\rightleftharpoons}} Fe^{2+}$ (1)

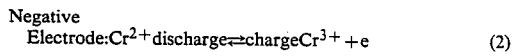

Negative Electrode: $Cr^{2+} \underset{charge}{\overset{discharge}{\rightleftharpoons}} Cr^{3+} + e$ (2)

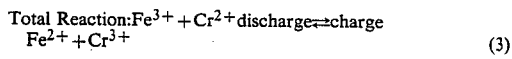

Total Reaction: $Fe^{3+} + Cr^{2+} \underset{charge}{\overset{discharge}{\rightleftharpoons}} Fe^{2+} + Cr^{3+}$ (3)

Thus, electric power is stored in each electrolyte, namely, in the active materials. Accordingly, when the concentration of the active material (for example, iron ions in the positive electrode and chromium ions in the negative electrode) dissolved in the electrolyte is lower, a larger amount of electrolyte and a higher flow rate of the recycled electrolyte are required in order to store the same amount of electricity. Accordingly, the capacity of tank or pump must be increased. In order to reduce these disadvantages, it is desirable to increase the concentration of the active material as high as possible. On the other hand, in order to reduce the cell resistivity, it is desirable that the hydrogen ion concentration of the electrolyte be increased and that the resistance of the ionic conduction through the membrane be reduced.

Heretofore, hydrochloric acid solutions have been used as the electrolytes, as described above. When the concentration of the hydrochloric acid is greatly increased, the hydrogen ion concentration is increased, and the resistance of the membrane is reduced. However, the chloride ion concentration is also increased at the same time, and therefore the solubility of chromium chloride which is an active material is reduced by common ion effect of the chloride ion. Thus, it is believed that the concentration of hydrochloric acid is suitably from 3 to 4 normal (N).

An electrolyte containing sulfuric acid, wherein hydrogen ion concentration is increased without increasing the chloride ion concentration, and thereby the cell resistivity is reduced without reducing the solubility of the active materials has been considered.

The cell resistivity of the redox flow battery primarily comprises electric resistance due to the overvoltage of the electrode reaction, and the above mentioned resistance of the membrane.

As described above, the addition of sulfuric acid can increase the hydrogen ion concentration and can reduce the electric resistance of the membrane. However, the portion of the resistance due to the electrode reactions increases with increasing concentration of the sulfuric acid. Thus, the overall battery performance is less improved (see, D through F of Example 2, (ii) of Example 4 and (ii) of Example 5 described hereinafter).

SUMMARY OF THE INVENTION

An object of the present invention is to provide an electrolyte for a redox flow battery wherein the cell resistivity is effectively reduced and the solubility of the active material is improved.

As a result of our studies, it appears that the above drawbacks in using sulfuric acid are attributable to the fact that sulfate ions inhibit charge/discharge reactions on the carbon fiber electrodes. We have now found that, when an acid comprising an anion which does not inhibit charge/discharge reactions on the carbon fiber electrodes is used as the added acid, the object described above can be accomplished.

BRIEF DESCRIPTION OF THE DRAWINGS

In the drawings:

FIG. 2 is a graph indicating the relation of the concentration of hydrobromic acid (N) and the concentration of hydrochloric acid to the cell resistivity, (N);

FIG. 4 is a graph indicating the relation between the cell resistivity and the concentrations (N) of the added acids when sulfuric acid and hydrobromic acid are added.

DETAILED DESCRIPTION OF THE INVENTION

Figure 1:
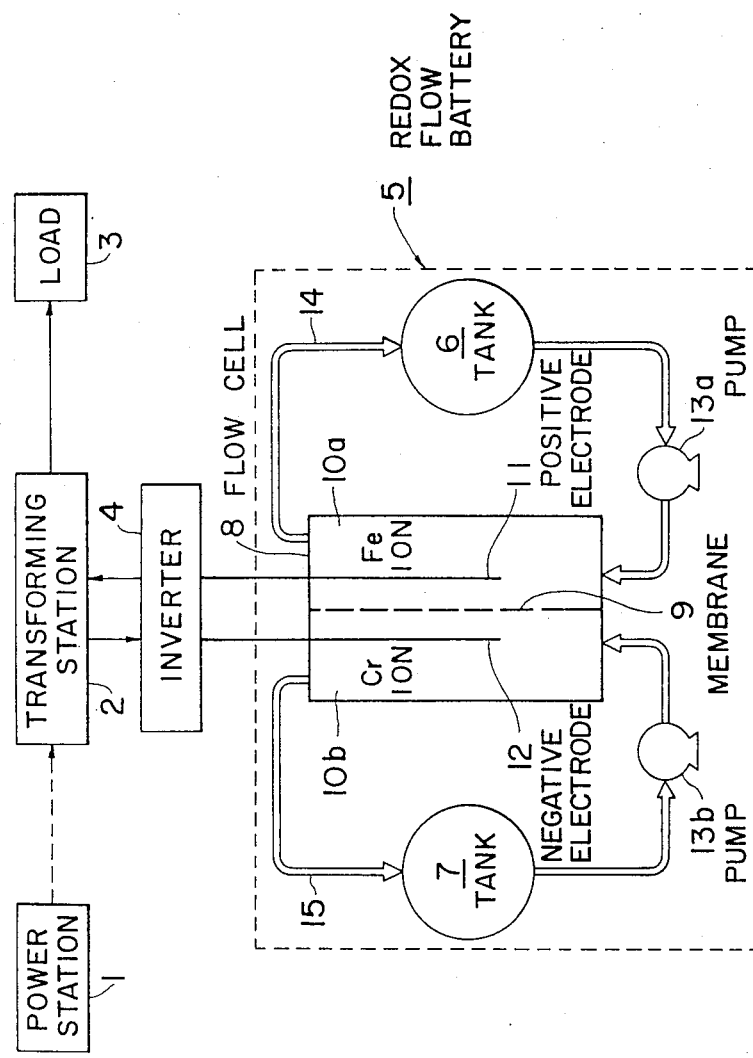
FIG. 1 is a schematic diagram in block form of an electric power storage system using a Redox flow battery.

An electrolyte for a Redox flow battery according to the present invention comprises from 1 to 4 normal (N) hydrochloric acid and at least 0.5 mole of an active material per liter of the electrolyte, wherein from 0.1 to 4 normalities (N) of an acid comprising an anion which does not inhibit the electrode reactions is contained in addition to hydrochloric acid.

It is desirable that one or more acids selected from hydrobromic acid and other hydrohalogenic acids be used as the acids comprising the anion which does not inhibit the electrode reactions. An electrolyte having the following composition is preferred.

Hydrochloric acid: 1 through 4 normal (N)
Active material: at least 0.5 mole per liter
Acid comprision anion which does not inhibit the electrode reactions: 0.1 through 4 normal (N)

When the above acid comprising the anion is added, the common ion effect due to chloride ions is reduced, and thus the solubility of the active material is improved.

The present invention will be illustrated more fully hereunder by way of Examples. In each Example, batteries were prepaed using electrolytes which are inside or outside the scope of the present invention, and the performances of these batteries were compared.

In the following Examples, in order to eliminate the influence of impurities and to clarify the effects and advantages of the present invention, all of the raw materials used for the electrolyte were of reagent grade.

The electrolyte used in each Example of the present invention was prepared by adding predetermined amounts of hydrochloric acid and hydrobromic acid or sulfuric acid (each being a special grade chemical) to chromic chloride and chromous chloride as an active material for a negative electrode and ferrous chloride and ferric chloride as active materials for a positive electrode (each being first class grade chemical), and dissolving the mixture in distilled water.

In order to examine the influence of the composition of the acid on the performance of the battery, the concentrations of the active materials were kept constant, and only the composition and concentration of acids were varied for comparison. In each Example, the negative electrolyte comprised 1.0 mole/liter of chromic chloride, and the positive electrolyte comprised 1.0 mole/liter of ferrous chloride and 1.0 mole/liter of ferric chloride.

EXAMPLE 1

(i) The performance of a battery obtained by using each of three electrolytes according to the present invention was measured. In these electrolytes, the concentration of hydrochloric acid was reduced as compared with the prior art and hydrobromic acid was incorporated therein. The results are shown in A, B and C of Table 1.

(ii) The performance of a battery obtained by using the acid composition of the electrolyte which has been heretofore used was measured. The results are shown in D of Table 1.

TABLE 1

| Sample No. | Concenration of hydrochloric acid(N) | Concentration of hydrobromic acid(N) | Cell resistivity (ohm-cm$^2$) | Coulombic efficiency(%) |
|---|---|---|---|---|
| A* | 1 | 3 | 1.54 | 97.3 |
| B* | 2 | 2 | 1.43 | 97.4 |
| C* | 2 | 3 | 1.30 | 97.0 |
| D | 4 | 0 | 1.50 | 97.4 |

*Electrolytes of the present invention

In A through C of Example 1, while the concentration of hydrochloric acid is ½ or ¼ times that of D of Example 1, the performance of the battery such as the coulombic efficiency and the cell resistivity is equal to or higher than those of D of Example 1.

Accordingly, the electrolytes of the present invention have the following advantages: By reducing the concentration of hydrochloric acid, the solubility of the active material is improved as compared with that of the prior art electrolyte. Further, capacities of pumps and tanks can be reduced. Furthermore, the cell resistivity is reduced, and its performance is improved.

EXAMPLE 2

(i) The present batteries containing 3 normal hydrochloric acid and various concentrations of hydrobromic acid were produced. The coulombic efficiency and the cell resistivity were measured. The results are shown in A through C of Table 2.

(ii) Batteries containing the same concentration (3N) of hydrochloric acid and sulfuric acid were produced for comparison. The coulombic efficiency and the cell resistivity of the batteries were measured. The results are shown in D through F of Table 2.

(iii) Further, a battery containing the same concentration (3N) of a hydrochloric acid and no hydrobromic acid or sulfuric acid was produced for comparison. The coulombic efficiency and the cell resistivity were measured. The results are shown in G of Table 2.

TABLE 2

| Sample No. | Concentration of hydrochloric acid(N) | Concentration of hydrobromic acid(N) | Concentration of sulfuric acid(N) | Cell resistivity (ohm-cm$^2$) | Coulombic efficiency (%) |
|---|---|---|---|---|---|
| A* | 3 | 1 | — | 1.44 | 97.9 |
| B* | 3 | 2 | — | 1.35 | 98.1 |
| C* | 3 | 3 | — | 1.34 | 97.5 |
| D | 3 | — | 1 | 1.65 | 98.0 |
| E | 3 | — | 2.5 | 1.65 | 98.0 |
| F | 3 | — | 4 | 1.79 | 97.7 |
| G | 3 | 0 | 0 | 1.72 | 97.8 |

*Electrolytes of the present invention

As can be seen from Table 2, hydrobromic acid provides an effect of reducing the cell resistivity greater than that provided by sulfuric acid and therefore the electrolytes according to the present invention exhibit significantly reduced cell resistivity.

EXAMPLE 3

(i) In electrolytes according to the present invention, the concentration of hydrochloric acid and the concentration of hydrobromic acid were varied. The cell resistivities were measured. The results are shown in FIG. 2. Curves A, B and C indicate the variations in cell resistivity obtained when the concentrations of hydrobromic acid added to a 1, 2 or 3N hydrochloric acid solution were varied.

Figure 3:
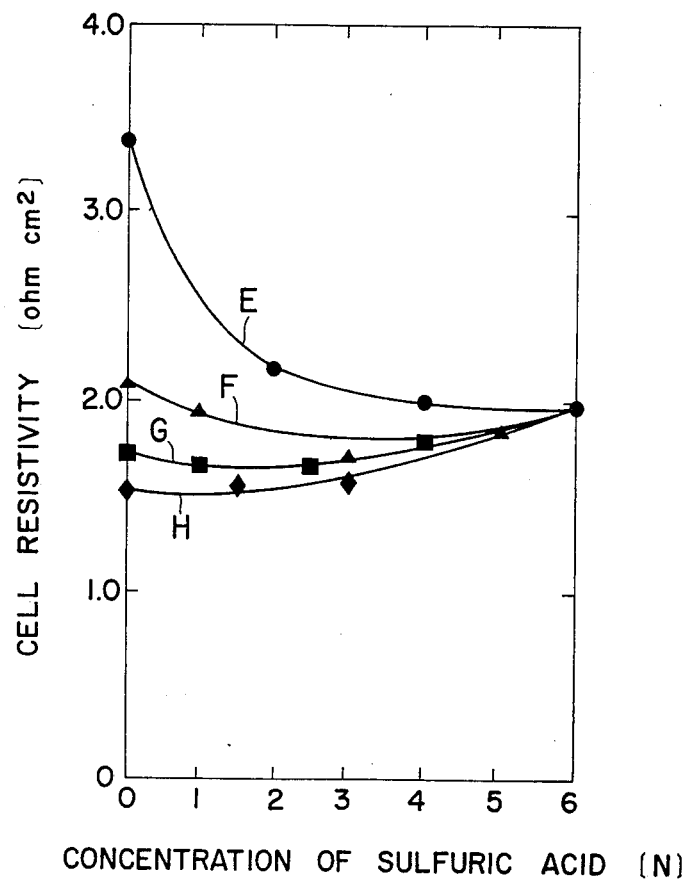
FIG. 3 is a graph indicating the relation of the concentration of sulfuric acid (N) and the concentration of hydrochloric acid (N) to the cell resistivity.

(ii) With respect to comparative electrolytes containing hydrochloric acid and sulfuric acid, the relationship between the composition of acids and the cell resistivity was examined. The results are shown in FIG. 3. Curves E, F, G and H exhibit the variations in cell resistivity obtained when the concentrations of sulfuric acid added to a 1, 2, 3 or 4N hydrochloric acid solution were varied.

As can be seen from FIGS. 2 and 3, the addition of hydrobromic acid provides an effect of reducing the cell resistivity, which is greater than that of the addition of sulfuric acid even when the concentration of hydrochloric acid is varied. In the case of sulfuric acid, it is difficult to reduce the concentration of hydrochloric acid as compared with that of the prior art electrolyte (4N) and to reduce the cell resistivity as compared with that of the prior art, whereas with the use of the electrolytes according to the present invention, the cell resistivity and the concentration of hydrochloric acid can be reduced.

EXAMPLE 4

In this Example, the influence of the concentration of an added acid on the portion of resistance attributable to the electrode reaction in the cell resistivity was measured. The results are shown in FIG. 4.

(i) The change in resistance in the case where hydrobromic acid was added as the electrolyte according to the present invention is represented by line A.

(ii) The change in resistance in the case where sulfuric acid was added as the electrolyte for a comparison is represented by curve B.

As can be seen from curve B, the resistance of the electrode reaction increases as the concentration of the sulfuric acid increases, while, as can be seen from line A, there is little increase in resistance of the electrode reaction when hydrobromic acid is added. On the other hand, the electric resistance of the membrane decreases with the increase of the hydrogen ion concentration in both cases.

That is, in (ii) of Example 4, the reduction in resistance of the membrane is offset by the increase in resistance of the electrode reactions. As a whole, the cell resistivity cannot be reduced. Accordingly a desirable acid to be added is an acid comprising an anion which does not inhibit the electrode reactions, such as hydrobromic acid as shown in the Examples.

Because of the concentration of hydrochloric acid in the electrolyte is advantageously as low as possible from the standpoint of improving the solubility of the active material, the concentration of hydrochloric acid is reduced as compared with that of the prior art and thus should be no more than 4N. It is known that while chromium in the negative electrolyte exists in the form of a monochloride complex ion $[CrCl.(H_2O)_5]^{2+}$ having a high reactivity on an electrode, this complex ion is gradually changed into a hexaaqua complex ion $[Cr(H_2O)_6]^{3+}$ having a low reactivity when the concentration of hydrochloric acid is less than 1N (see, for example, Narusawa et al., J. Inorg. Nucl. Chem., 29, 123-132, 1967). For this reason, it is desirable that the concentration of hydrochloric acid be at least 1N.

As can be seen from FIG. 2 showing the results of Example 3, if the concentration of the acid comprising an anion which does not inhibit the electrode reactions such as hydrobromic acid is more than 4N, further effects will not be obtained. The use of such higher concentrations is economically unsuitable. If the concentration of such acids is less than 0.1N, the effect of reducing the cell resistivity is less than 5%. Accordingly, in the present invention, the concentration of the acid comprising the anion which does not inhibit the electrode reactions such as hydrobromic acid is suitably from about 0.1N to about 4N.

While hydrobromic acid has been used herein as the acid comprising the anion which does not inhibit the electrode reactions other than hydrochloric acid, other hydrohalogenic acids such as hydroiodic acid can also be used. In addition to hydrohalogenic acids, one or more mineral acids other than hydrohalogenic acid, for example, sulfuric acid, nitric acid, phosphoric acid, thiocyanic acid and perchloric acid, in a low concentration of, preferably, lower than 1N, which dissociate in 0.1 to 4 normalities of hydrochloric acid do not affect the structure of a complex ion of an active material, and therefore such acids can be also used as the acid comprising the anion which does not inhibit the electrode reaction with the same results.

As stated hereinbefore, chromium chloride is exclusively used in the negative electrode, whereas, in addition to an iron chloride, an iron sulfate can also be used in the positive electrode with the same results.

While the redox system comprising iron and chromium has been described herein, systems other than the iron-chromium system described above, for example, Mn/Cr, Br$_2$/Cr, and Cl$_2$/Cr can also be used in the present invention provided that the battery is a redox flow battery wherein chromium ion is used as the active material. This is because they improve the solubility of the active material, do not increase the reaction resistance of the battery and provide other effects and advantages.

As stated hereinbefore, in the present invention, the acid comprising the anion which does not inhibit the charge/discharge reactions on carbon fiber electrodes is incorporated in the electrolyte. Accordingly, the cell resistivity is effectively reduced and the solubility of the active material is improved. Thus, the present invention can provide a more compact high performance redox flow battery.

What is claimed is:

1. An electrolyte for a negative or positive electrode of a redox flow battery containing from 1 to 4 normalities of hydrochloric acid, at least 0.5 mole of an active material per liter of the electrolyte, said active material being chromium chloride for the negative electrode electrolyte and iron chloride or iron sulfate for the positive electrode electrolyte, the electrolyte further comprising from 0.1 to 4 normalities of an acid comprising an anion from one or more hydrohalogenic acids which does not inhibit electrode reactions, in addition to the hydrochloric acid.

2. The electrolyte according to claim 1 wherein the hydrohalogenic acid is hydrobromic or hydroiodic acid.

* * * * *